United States Patent
Webman et al.

(10) Patent No.: US 12,436,943 B2
(45) Date of Patent: Oct. 7, 2025

(54) MECHANISMS FOR EFFICIENT POINT-IN-TIME CREATION AND MAINTENANCE IN A DISTRIBUTED DATABASE

(71) Applicant: Regatta Data Ltd., Bet Hanania (IL)

(72) Inventors: Erez Webman, Petach Tikva (IL); Irit Yadin-Lempel, Caesarea (IL); Eran Borovik, Zikhron Ya'akov (IL); Hilla Atzmon, Haifa (IL)

(73) Assignee: Regatta Data Ltd., Bet Hanania (IL)

( * ) Notice: Subject to any disclaimer, the term of this patent is extended or adjusted under 35 U.S.C. 154(b) by 0 days.

(21) Appl. No.: 18/431,285

(22) Filed: Feb. 2, 2024

(65) Prior Publication Data
US 2024/0370427 A1    Nov. 7, 2024

Related U.S. Application Data

(60) Provisional application No. 63/499,566, filed on May 2, 2023.

(51) Int. Cl.
*G06F 16/23* (2019.01)
*G06F 16/215* (2019.01)
*G06F 16/27* (2019.01)

(52) U.S. Cl.
CPC ........ *G06F 16/2379* (2019.01); *G06F 16/215* (2019.01); *G06F 16/27* (2019.01)

(58) Field of Classification Search
CPC .............................. G06F 16/2379; G06F 16/27
(Continued)

(56) References Cited

U.S. PATENT DOCUMENTS

| 7,395,382 B1 | 7/2008 | Moir |
| 9,659,038 B2 * | 5/2017 | Saito ........................ G06F 16/27 |

(Continued)

FOREIGN PATENT DOCUMENTS

| CN | 114968976 A | 8/2022 |
| EP | 2595068 | 5/2013 |

(Continued)

OTHER PUBLICATIONS

Scriba, Dr. Albrecht, "Chapter 9: Point in Time Copies (Snapshots)", Storage Management in Data Centers, Springer-Verlag, Berlin, Germany, © 2009, pp. 233-317.*

(Continued)

*Primary Examiner* — Robert Stevens
(74) *Attorney, Agent, or Firm* — M&B IP Analysts, LLC

(57) ABSTRACT

A method and system for managing execution of database transactions by facilitating point-in-time image (PIT). The method comprises receiving at least one statement being part of a transaction, the transaction is initiated by a client to be executed on a distributed database system; sending a single request to a sequencer server (SEQ-server) to create at least one PiT, wherein the SEQ-server provides a logical timestamp counter (LTC) value as a timestamp of the PiT; upon creation of the at least one PiT, causing execution of the at least one statement, a PiT provides a state and content of committed data in the distributed database system; upon receiving a commit statement, performing a commitment process of the transaction, the commitment process is based on a commitment timestamp (CMTS) set by the SEQ-server based on an incremented value of the LTC; and returning an acknowledgment of the transaction commitment to the client.

45 Claims, 10 Drawing Sheets

(58) Field of Classification Search
USPC .......................................................... 707/703
See application file for complete search history.

(56) References Cited

U.S. PATENT DOCUMENTS

| | | | |
|---|---|---|---|
| 10,630,840 | B1 | 4/2020 | Karp et al. |
| 11,593,316 | B2 * | 2/2023 | Haldar ................ G06F 11/1448 |
| 11,843,663 | B1 * | 12/2023 | Depoutovitch ......... G06F 16/27 |
| 12,056,130 | B1 | 8/2024 | Ayala et al. |
| 12,321,847 | B2 | 6/2025 | Kauffmann et al. |
| 2007/0271242 | A1 | 11/2007 | Lindblad |
| 2012/0311273 | A1 | 12/2012 | Marathe et al. |
| 2013/0085988 | A1 * | 4/2013 | Hiraguchi ............... G06F 16/27 707/703 |
| 2016/0092496 | A1 | 3/2016 | Dietterich et al. |
| 2016/0306709 | A1 | 10/2016 | Shaull |
| 2017/0139890 | A1 | 5/2017 | Bendig et al. |
| 2017/0357577 | A1 | 12/2017 | Lee et al. |
| 2018/0144014 | A1 | 5/2018 | Mittal et al. |
| 2018/0349418 | A1 | 12/2018 | Lee et al. |
| 2021/0034598 | A1 | 2/2021 | Arye et al. |
| 2022/0164366 | A1 * | 5/2022 | Kuppahally ............ G06F 16/27 |
| 2022/0245133 | A1 * | 8/2022 | Li ....................... G06F 16/2379 |
| 2022/0300483 | A1 | 9/2022 | Singh et al. |
| 2023/0334031 | A1 | 10/2023 | Acker et al. |
| 2023/0385742 | A1 | 11/2023 | Dybas et al. |
| 2024/0370418 | A1 | 11/2024 | Webman et al. |
| 2025/0028694 | A1 | 1/2025 | Yadin-Lempel et al. |
| 2025/0156400 | A1 | 5/2025 | Al-Shihabi et al. |

FOREIGN PATENT DOCUMENTS

| | | | |
|---|---|---|---|
| EP | 2738697 | A1 | 6/2014 |
| EP | 3401806 | A1 | 11/2018 |
| WO | 2019226387 | A1 | 11/2019 |

OTHER PUBLICATIONS

Moh, Chuang-Hue, "Snapshots in a Distributed Persistent Object Storage System", Massachusetts Institute of Technology, Boston, MA, Master of Science in Electrical Engineering and Computer Science Dissertation, May 2003, 62 pages.*
Barber, Ronald, et al., "WiSer: A Highly Available HTAP DBMS for IoT Applications", BigData 2019, Los Angeles, CA, Dec. 9-12, 2019, pp. 268-277.*
Wu, Lengdong, et al., "Survey of Large-Scale Data Management Systems for Big Data Systems", Journal of Computer Science and Technology, vol. 30, Issue 1, SpringerNature Link, Jan. 2015, pp. 163-183.*
International Search Report for PCT/IB2024/056903, dated Nov. 10, 2024. Searching Authority, Israel Patent Office, Jerusalem, Israel, 3 pages.
Written Opinion of the Searching Authority for PCT/IB2024/056903, dated Nov. 10, 2024. Searching Authority, Israel Patent Office, Jerusalem, Israel, 4 pages.
International Search Report for PCT/IB2024/050987, dated Jul. 11, 2024. Searching Authority, Israel Patent Office, Jerusalem, Israel, 4 pages.
Moh, Chuang-Hue; Liskov, Barbara. TimeLine: A High Performance Archive for a Distributed Object Store. In: NSDI. 2004. Mar. 29, 2004 (Mar. 29, 2004) the whole doc, 15 pages.
Written Opinion of the Searching Authority for PCT/IB2024/050987, dated Jul. 11, 2024. Searching Authority, Israel Patent Office, Jerusalem, Israel, 4 pages.
Yong I Yoon, Song C Moon, Reliable transaction processing for real-time distributed database systems, Microprocessing and Microprogramming, vol. 34, Issues 1-5, 1992, ISSN 0165-6074, Feb. 28, 1992 (Feb. 28, 1992) the whole doc, 3 pages.
Ado.net, Snapshot Isolation in SQL Server, Sep. 15, 2021, 13 pages.
Sybooks online, Snapshot isolation, 2012 (Year: 2012) 1 page.
Sybooks online., Enabling snapshot isolation, 2012 (Year: 2012) 1 page.

* cited by examiner

800

┌─────────────────────────────────────────────────────────────────────┐
│ Receive a request for creating a commitment timestamp (CMTS), the request │
│ is initiated by a transaction manager and sent by the SEQ-agent    │
│                            S810                                     │
└─────────────────────────────────────────────────────────────────────┘
                                    │
                                    ▼
┌─────────────────────────────────────────────────────────────────────┐
│                        Increment the LTC                            │
│                            S820                                     │
└─────────────────────────────────────────────────────────────────────┘
                                    │
                                    ▼
┌─────────────────────────────────────────────────────────────────────┐
│ Send the LTC value to SEQ-agent as the CMTS, the CMTS is returned to the │
│        transaction manager as a transaction CMTS                    │
│                            S830                                     │
└─────────────────────────────────────────────────────────────────────┘

FIG. 8

MECHANISMS FOR EFFICIENT POINT-IN-TIME CREATION AND MAINTENANCE IN A DISTRIBUTED DATABASE

CROSS-REFERENCE TO RELATED APPLICATIONS

This application claims the benefit of U.S. Provisional Application No. 63/499,566 filed on May 2, 2023, the contents of which are hereby incorporated by reference.

TECHNICAL FIELD

The present disclosure generally relates to databases, and, specifically techniques for implementation for efficient creation of point-in-time images for distributed databases.

BACKGROUND

In databases, concurrency control (CC) protocols ensure that correct results for concurrent operations are generated as quickly as possible. Typically, a concurrency control protocol provides rules and methods typically applied by the database mechanisms to maintain the consistency of transactions operating concurrently and, thus, the consistency and correctness of the whole database. Introducing concurrency control into a database would apply operation constraints which typically result in some performance reduction. Operation consistency and correctness should be achieved with as good as possible efficiency without reducing the database's performance. However, a concurrency control protocol can require significant additional complexity and overhead in a concurrent algorithm compared to the simple sequential execution of the transaction.

Databases are designed with Atomicity, Consistency, Isolation, Durability (ACID) requirements. In some databases, the ACID requirements are relaxed, where multiple transactions can be executed concurrently and independently of each other, such that transaction access overlaps. That may result in various inconsistencies or anomalies. A database can be designed to provide ACID guarantees that eliminate or minimize the exposure of such anomalies. In general, there are varying degrees of ACID guarantees, and many databases provide a non-perfect degree of ACID guarantees, where the exact guarantees vary among the different database products.

Typically, such guarantees are defined by the isolation-level of their transaction execution. An isolation-level expresses how transactions are "isolated" from each other, especially related to their data-cell read and write activities. That is, isolation of transactions means how the anomalies can be mitigated or completely avoided. The strongest transaction isolation-level is serializable. In this isolation-level, the database provides mechanisms guaranteeing the isolation for the concurrent execution of transactions, while maximizing the concurrency of the execution transactions as much as possible.

A relaxed approach for isolation-level guarantees, as performed by some traditional relational databases is based on creating a "frozen" point-in-time image (hereafter PiT Image, or simply a PiT or PiTs) for a transaction. The PiT provides the state and the content of the committed data and allows to read data cell based on the values of a PiT.

Various techniques for creating, maintaining, and removing PiTs are discussed in the related art. However, these techniques are mostly limited to creating, maintaining, and removing PiTs in a non-distributed database. A distributed database includes multiple nodes (typically, a node is a computer) where the nodes may be situated in the same physical location or in multiple locations.

Creating, maintaining, and removing PiTs in a distributed database provides a number of challenges not efficiently addressed by currently available PiT solutions. For example, creating a PiT in a distributed environment requires that the point-in-time of the frozen "transaction" be consistent across all the nodes of the database. Further, current solutions are not scalable enough, not fast enough, and slows down other activities in a non-linearly scalable fashion, thereby such a solution does not allow a very high-rate PiT creation, especially in clusters with large number of nodes.

It would therefore be advantageous to provide efficient solutions for creating, maintaining, and removing for PiT in distributed databases.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving at least one statement being part of a transaction, where the transaction is initiated by a client to be executed on a distributed database system. Method may also include sending a single request to a sequencer server (SEQ-server) to create at least one PiT, where the SEQ-server provides a logical timestamp counter (LTC) value as a timestamp of the PiT. Method may furthermore include upon creation of the at least one PiT, causing execution of the at least one statement, where a PiT provides a state and content of committed data in the distributed database system. Method may in addition include upon receiving a commit statement, performing a commitment process of the transaction, where the commitment process is based on a commitment timestamp (CMTS) set by the SEQ-server based on an incremented value of the LTC. Method may moreover include returning an acknowledgment of the transaction commitment to the client. Other embodiments of this aspect include corresponding computer systems, apparatus, and computer programs recorded on one or more computer storage devices, each configured to perform the actions of the methods. Implementations may include one or more of the following features. Method may include generating the CMTS based on the incremented value of the LTC. Implementations of the described techniques may include hardware, a method or process, or a computer tangible medium.

In one general aspect, system may include one or more processors configured to: System may also include receive at least one statement being part of a transaction, where the transaction is initiated by a client to be executed on a distributed database system. System may furthermore include sending a single request to a sequencer server (SEQ-server) to create at least one PiT, where the SEQ-server provides a logical timestamp counter (LTC) value as a timestamp of the PiT. System may in addition include upon creation of the at least one PiT, cause execution of the at least one statement, where a PiT provides a state and content of committed data in the distributed database system. System may moreover include upon receiving a commit statement, perform a commitment process of the transaction, where the commitment process is based on a commitment timestamp (CMTS) set by the SEQ-server based on an incremented value of the LTC. System may also include return an acknowledgment of the transaction commitment to the client. Other embodiments of this aspect include corresponding computer systems, apparatus, and computer programs recorded on one or more computer storage devices, each configured to perform the actions of the methods.

In one general aspect, distributed database system may include a plurality of nodes, where each of the plurality of nodes incudes a storage implementing a persistent data-layout that allows multi-version data-cells and one or more processors. Distributed database system may also include one sequencer server (SEQ-server and a plurality of SEQ-agents executed on a plurality of nodes; where the one or more processors on each node configured to: receive at least one statement being part of a transaction, where the transaction is initiated by a client to be executed on a distributed database system; send a single request to the SEQ-server to create at least one PiT, where the SEQ-server provides a logical timestamp counter (LTC) value as a timestamp of the PiT; upon creation of the at least one PiT, cause execution of the at least one statement, where a PiT provides a state and content of committed data in the distributed database system; upon receiving a commit statement, perform a commitment process of the transaction, where the commitment process is based on a commitment timestamp (CMTS) set by the SEQ-server based on an incremented value of the LTC. System may in addition include return acknowledgment of the transaction commitment to the client.

Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 8 is a flowchart of a process of creating a commitment timestamp (CMTS) according to an embodiment.

DETAILED DESCRIPTION

Figure 1:
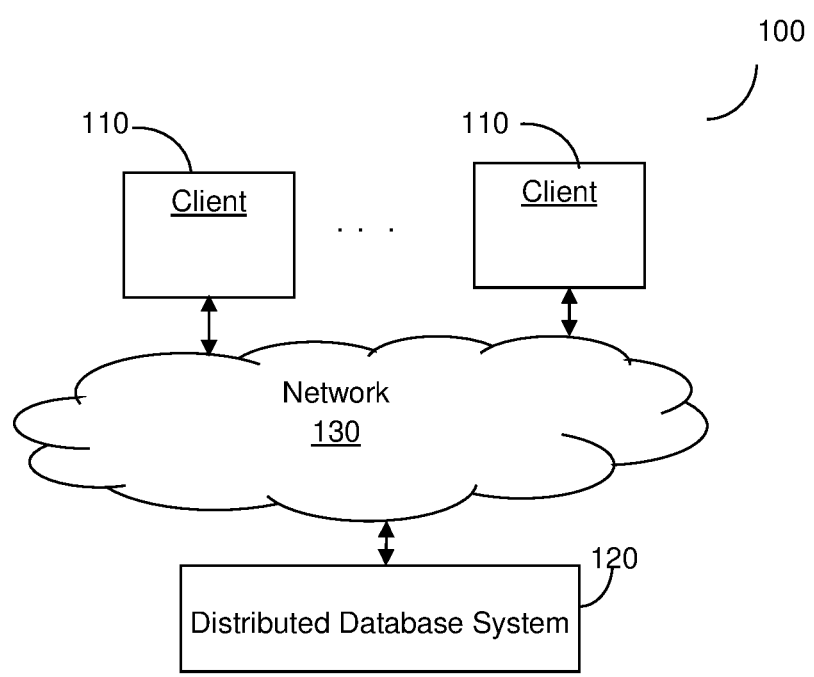
FIG. 1 is a network diagram of a distributed computing environment utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, numerals refer to like parts through several views.

Some example embodiments provide a system and method for efficient and fast high-rate creation of PiTs in a scalable distributed database system. The disclosed embodiments also disclose a method for utilizing the created PiTs combined with mechanisms for high-rate distributed commitments of transactions in the distributed database system.

The ability to create high-rate PiTs and perform high-rate commitments allows for performing higher parallelism in the execution of transactions. That is, the disclosed embodiments allow for fast execution of transactions and processing of more transactions at a given time period. As such, the disclosed embodiments provide a technical improvement over current database systems that, in most cases, fail to provide efficient mechanisms for creating PiTs in distributed database systems, and specifically databases with a large number of nodes that handle high-rate of transactions. It should be noted that the embodiments described herein are not limited to database systems but are also applicable to distribute data management systems, such as an object storage system, a key-value storage system, a file system, and the like.

FIG. 1 shows an example network diagram 100 of a distributed computing environment utilized to describe the various disclosed embodiments. In the example network diagram 100, a plurality of clients 110 and a distributed database system (or simply database) 120 are connected to a network 130. The network 130 may be but is not limited to, wireless, cellular, or wired network, a local area network (LAN), a wide area network (WAN), a metro area network (MAN), the Internet, the Worldwide web (WWW), similar networks, and any combination thereof.

Each client 110 is configured to access the database 120 through the execution of transactions. A client 110 may include any computing device executing applications, services, processes, and so on. A client 110 can run a virtual instance (e.g., a virtual machine, a software container, and the like).

In some configurations, clients 110 may be software entities that interact with the database 120. Clients 110 are typically located in compute nodes that are separate from the database 120 and communicate with the database 120 via an interconnect or over a network. In some configurations, an instance of a client 110 can reside in a node that is part of the database 120.

The database 120 may be designed according to a shared-nothing or a shared-everything architecture. In one example embodiment, transactions to the database 120 are processed without locks placed on data entries in the database 120. This allows for fast processing retrieval and modifications of data sets.

A transaction is issued by a client 110, processed by the database 120, and the results are returned to the client 110.

A transaction typically includes the execution of various data-related operations over the database system 120. These operations are often originated by clients 110. The execution of such operations may be short or lengthier. In many cases, operations are independent and unaware of each other's progress.

A transaction can be viewed as an algorithmic program logic that potentially involves reading and writing various data-cells. A transaction, for example, may read some data-cells through one data operation, and then, based on the values read, can decide to modify other data-cells. That is, a transaction is not just an "I/O operation" but is more of a "true" computer program. A data-cell is one cell of data. Data cells may be organized and stored in various formats and ways. Data cells, defined below, may be contained in files or other containers and can represent different types (integer, string, and so on).

An execution of a transaction may be shared between a client and the database 120. For instance, in an SQL-based relational database, client 110 interacts with the database using SQL statements. Client 110 can begin a transaction by submitting an SQL statement. That SQL statement is executed by database 120. Depending on the exact SQL statement, database 120 performs various read and/or write operations as well as invokes algorithmic program logic typically to determine which (and whether) data-cells are read and/or written. Once that SQL statement completes, the transaction is generally still in progress. The client 110 is configured to receive the response for that SQL statement and potentially executes some algorithmic program logic (inside the client node) that may be based on the results of the previous SQL commands, and as a result of that additional program logic, may submit an additional SQL statement and so on and so forth. At a certain point, and once the client 110 receives an SQL statement response, the client 110 can instruct the database 120 to commit the transaction.

It should be noted that the client 110 can submit a transaction as a whole to the database 120, and/or submit multiple statements for the same transaction together, and/or submit a statement to the database 120 with an indication for the database to commit after the database 120 completes the execution of that statement.

It should be further noted that transactions may be abortable by the database 120 and/or a client 110. Often, aborting a transaction clears any of the transaction's activities.

For the sake of simplicity and ease of description, a reference is made to a transaction initiated and committed by a client, and statements of the transaction are performed by the database 120. A transaction may include one or more statements. A statement may include, for example, an SQL statement. One of the statements may include a request to commit the transaction. In order to execute such a statement, the database may break the statement execution into one or more tasks, where each such task is running on a node. With this modeling, a task does not execute on more than a single node, but multiple tasks of the same statement can execute on the same node if needed. A task is an algorithmic process that may require the execution of read operation(s) and/or write operations(s) on data cells.

In an embodiment, the database 120 is a distributed database and may be realized as a relational database system (RDBMS) or a non-relational database. As will be demonstrated in FIG. 2 below, a distributed database is a configuration of multiple nodes that may be situated in the same physical location, or in multiple locations. Such locations are typically not geographically distributed. The distribution arrangement of database 120 requires the execution of transactions and their operations on different nodes independent of each other. Typically, a node is a computer, however, it can also be a virtual-server, a user-mode process, a combination thereof, and the like.

Figure 2:
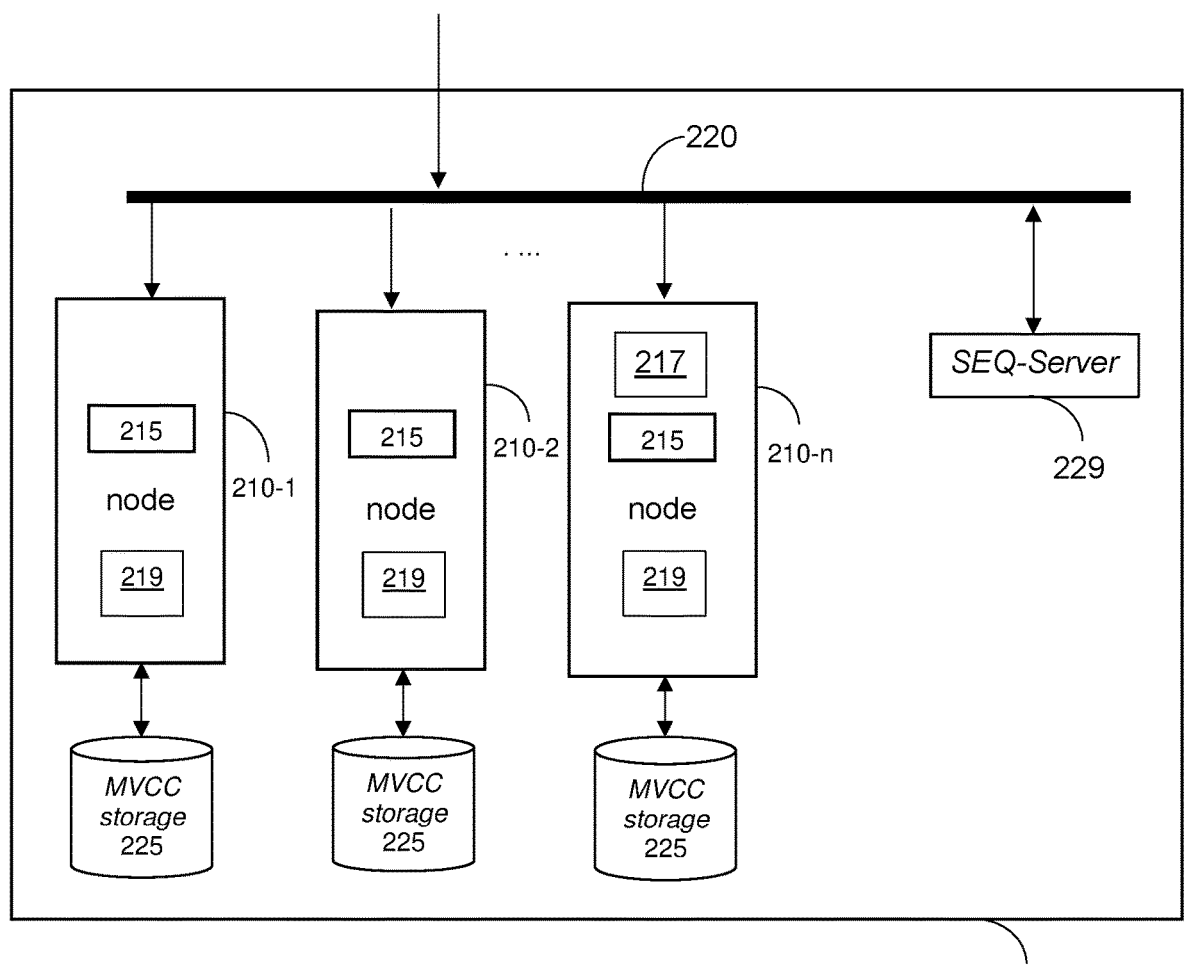
FIG. 2 is a block diagram of a distributed database system arranged according to an embodiment.

FIG. 2 shows an example diagram of database 120 arranged according to an embodiment. The database 120 includes a plurality of nodes 210-1 through 210-n, which are distributed. Each node 210 may be realized as a physical device or a virtual instance executed on a physical device. A virtual device may include a virtual machine, a software container, a service, and the like. The physical device, an example of which is disclosed below, includes at least a processing circuitry and a memory. A physical device may also include a storage, a shared storage accessed by other nodes 210, or a combination thereof. The storage stores the data maintained by the database 120. The nodes 210 may be deployed in one or more data centers, cloud computing platforms, and the like. The communication and synchronization among the nodes 210 is performed through an interconnect network 220.

In one embodiment, the nodes 210, and hence the database 120 are designed with a shared-nothing architecture. In such an architecture, nodes 210 are independent and self-sufficient as they have their own disk space and memory. As such, in the database 120, the data is split into smaller sets distributed across the nodes 210. In another embodiment, the nodes 210, and hence the database 120 are designed with a shared-everything architecture where the storage is shared among all nodes 210.

The data managed by the database can be viewed as a set of data-cells. Typically, data-cells would be considered as items, such as what relational databases refer to as "column cells," those data-cells can actually be any type of data, a data object, a file, and the like.

Databases often organize a higher level of a data object referred to as a data-row (or simply row). A data-row may include a collection of specific data-cells. For example, in relational databases, a set of rows form a database table. The data-cells contained by a specific row are often related to one "entity" that the row describes. In relational databases, the concept of a data-row is inherent to the data-model (i.e., one of the foundations of the relational data-model is processing "data tuples" that are effectively data-rows). Often, data-cells can be added or removed only as part of their data-row. In other words, a data-row can be added (or removed), thus adding more (or removing existing) data-cells to the database.

Typically, all the data-cells of a specific row reside in close proximity (e.g., consecutively) on the storage device (as well as in RAM), as this can ensure that multiple cells of the same row (or all the cells of the row) can be read from the disk more cheaply (e.g., with a single small disk I/O) than if those cells would each be stored elsewhere on the disk (e.g., with n disk I/Os to n different disk locations in order to retrieve n cells of the same row). Further, the metadata for managing the data-cell information may also be organized in a rougher resolution as it may result in meaningfully lesser and smaller overall metadata.

In some implementations, a specific data-row can be viewed as if it exists and just contains a single specific data-cell. In one configuration, and without limiting the scope of the disclosed embodiments, a single cell, and a single row may reside in a specific storage device of a node 210. However, it should be noted that a row can be divided across multiple nodes 210. It should be further noted that the disclosed embodiments can be adapted to operate in databases where data cells are stored and arranged in different structures. In some embodiments, where a row is divided across multiple nodes, the "sub row" that is stored under a single node and or storage device could be treated as a data-row.

In another configuration, and without limiting the scope of the disclosed embodiments, the database may also store various pieces of data, in addition to the data-cells and data-rows. Including, but not limited to, any and all metadata, various data structures, configuration information, a combination thereof, and the like (hereinafter "metadata").

An operation of a task may access a single data cell in a single node 210. Furthermore, multiple operations (of the same or different transactions) may access the same data cells simultaneously or substantially at the same time. There is no synchronization when such operations, tasks, or statements of a transaction or transactions are performed. In a typical computing environment, hundreds of concurrent transactions can access the database 120. As such, maintaining and controlling the consistency of transactions and their operations is a critical issue to resolve in databases.

In an embodiment, each node 210 includes an agent (or a transaction agent) 215 configured to manage access to data stored on the respective node. The agent 215 may be realized in hardware, software, firmware, or a combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The agent 215 is configured to manage the contents of data cells and operations within a node. For example, when a write operation requires access to data cell(s), the agent 215 may be configured to point to the requested cell(s). In an embodiment, each transaction is managed by a transaction manager 217. A transaction manager 217 is an instance executed over one of the nodes 210 and configured to orchestrate the execution of a transaction across one or more nodes 210. The transaction manager 217 may be instantiated on any node 210.

In the example shown in FIG. 2, the transaction manager 217 is configured to be executed on the node 210-*n*. The transaction manager 217 can be realized as a software object, a script, and the like executed over the hardware of a respective node 210. It should be noted that multiple transaction managers may be executed on one node or multiple nodes, where each transaction manager 217 can handle a single transaction.

A sequence server (SEQ-server) 229 can be viewed as a software module. According to an embodiment, the database 120 contains a single SEQ-server 229, running on one of the nodes 210. In some embodiments, the SEQ-server 229 is configured to dynamically move to another node 210 for various practical needs, such as, but not limited to, the need to provide high-availability and fault-tolerance, the need to balance the overall load of the cluster, the need to remove the node that the SEQ-server 229 is currently on, a combination thereof, and the like. In one configuration the SEQ-server 229 is statically located. In another configuration, the SEQ-server 229 is configured to be moved.

According to one configuration, the SEQ-server 229 is configured to run on a dedicated node 210, or in a node 210.

According to the disclosed embodiments, the SEQ-server 229 is configured to execute processes for the creation of point-in-time images (hereinafter "PiT" or "PiTs"). The SEQ server is also responsible for allocating commitment timestamps (CMTSs). A PiT is the current state (or contents) of the data maintained by the database system 120 of the committed data for a given timestamp. A PiT is typically created at the beginning of the transaction (or during the execution of a transaction) upon request initiated by a transaction manager. As discussed in detail below, the disclosed embodiments allow the creation of PiTs with minimal communication between transaction managers and the SEQ-Server 229 and without any need to synchronize the creation of PiTs among other nodes 210.

In an embodiment, the SEQ-server 229 is configured to include or implement a logical timestamp counter (LTC). The LTC is incremented (or increased) upon creation of a PiT. It should be noted that the LTC can be realized as an integer counter, a timer, a register, and the like, or any monotonically increasing counter. Further, the LTC can be incremented by one or increased by any arbitrary number. The LTC's value is treated as a PiT creation timestamp. It should be emphasized that there is a single LTC in the SEQ-server 229 that provides the timestamp for PiT or CMTS.

According to the various disclosed embodiments, a sequencer agent (SEQ-agent) 219 is a software entity. In some embodiments, SEQ-agents 219 are located in various database nodes 210. The SEQ-agent 219 is configured to communicate with the SEQ-server 229 and provide various services to a respective node. In one configuration, the SEQ-agents 219 are located inside of each node. In another configuration, the SEQ-agents 219 may be separate from the node and be located in different areas such as, but not limited to, a different node 210 than the node using the services of the SEQ-agent 219. In some embodiments, the SEQ-agent 219 is configured to provide services to multiple nodes.

The Multi-Version Concurrency-Control (MVCC) storage 225 is a persistent storage or memory configured to store data. Further, in some configurations, the MVCC can be realized as a data layout on a physical or virtual disk. According to an embodiment, node 210 is responsible for specific data-cells and data-rows. Each node has access to MVCC storage 225 that allows read and write operations based on the MVCC data-layout configured with the MVCC storage 225. It should be noted that the database 120 may contain stateless compute nodes whose main functionality is to participate in various computations the database performs. Such nodes may not necessarily contain the MVCC data layout.

The structure of the Multi-Version Concurrency-Control (MVCC) data layout is a persistent data-layout that allows multi-version data-cells in the MVCC storage 225, regardless of whether the CC-protocol in use directly exploits multi-version data-cells or not. Typically, databases need the ability to store multiple data-cell versions for various reasons, including for PiT maintenance and for storing uncommitted data-cell versions as well as temporarily storing both uncommitted versions, committed versions, uncommitted versions that just recently became committed versions, committed versions that just recently became not-up-to-date versions (and may soon be removed), and so on.

In such cases, there is a need for persistent (and sometimes also non-persistent) data-layouts that allow the maintenance of multiple versions. Such data-layouts allow various "write" operations, such as, for example, the insertion of new data-cells, the insertion of new data-cell versions, the modification of existing data-cell versions, the removal of data-cell versions or of the entire data-cell, etc. Further, databases typically store all the data-cells of a data-row together rather than storing each data-cell separately. Therefore, MVCC data-layouts often store data-rows and datarow-versions rather than data-cell and data-cell versions. If a specific data-cell has a new version, such MVCC data-layouts store a new version of the entire row.

In the context of databases and data management, "row-versioning" typically refers to a mechanism that maintains a historical version of each row in a table to manage concurrency and to provide the ability to restore previous versions. Row versioning is a database management technique used to maintain different versions of the same row at the same time. For example, if a row is modified after a Point-in-Time (PiT) is created, the database needs to maintain both the original and modified versions of the row. Similarly, if a row is updated during a transaction, some databases keep the updated version as an uncommitted row version until the transaction commits alongside the original row-version.

In an embodiment discussed herein, the MVCC data-layout to be of a row granularity, where versioning is managed using row-versions and when data-row can be added or removed. It should be noted that MVCC data-layouts that use different (finer or rougher) granularities, such as data-cell granularity can be used as well. Further, embodiments where the data-cells can be added and removed are supported as well.

The MVCC data-layout also provides a means for searching and reading specific row-versions (or any subset of their cells). For example, searching and reading a specific row can be done by using any specific row identification technique the database is internally using. The second aspect is the need to reach the desired version of the row, where it is not always known ahead of time which version that would be. In many cases, this task is achieved by performing searches that refer to the Timestamps of the existing versions of the row, and/or by traveling between versions of the same row by their timestamp (possibly in either direction).

It should be noted that the timestamp information can be considered part of the metadata used for the realization of the MVCC data-layout. In some configurations, the MVCC data-layout utilizes the commitment timestamp as the timestamp used by the various read operations, and that MVCC data-layout is used also for storing uncommitted row-versions. In such configurations, when a new row-version (e.g., for an existing row) is first created and is still in an uncommitted state, the commitment timestamp is generally not yet known. This problem can be solved in a variety of approaches. It should be emphasized that the disclosed embodiments can be adapted to support any type of storage with any type of layout.

Figure 3:
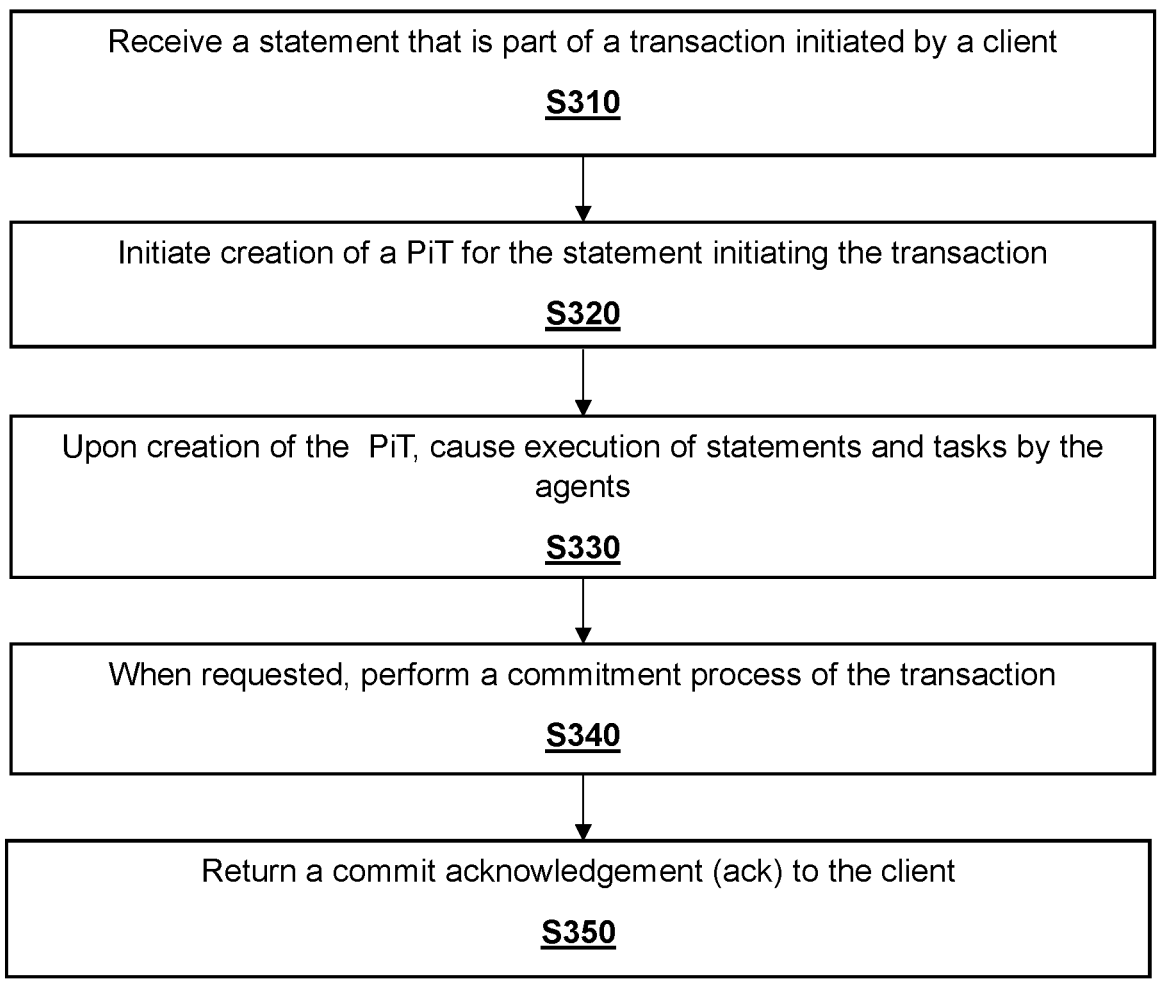
FIG. 3 is a flowchart of a method of operation of a transaction manager, according to an embodiment.

FIG. 3 shows an example flowchart 300 of a method for executing a transaction directed to the transaction database 120 according to an embodiment. The method can be performed by a transaction manager instantiated on one of the nodes, such nodes as 210, FIG. 2. It should be noted that FIG. 3 is an example that discusses the creation of a point-in-time image (PiT) at the beginning of the transaction. However, such creation of a PiT could occur at any and all stages of a transaction. Alternatively or collectively, a PiT may be created per statement received from a client to be executed over the database 120 or upon reception of a number of statements. It should be noted that the decision when to request and/or create a PiT may be based on the execution requirements of the transaction, required isolation-mode, and the like.

At S310, at least one statement that is part of a transaction initiated by a client is received. As mentioned above, a transaction may include a collection of statements, each of which may include a collection of tasks. A task may require the execution of read operation(s), write operation(s), or both. A statement may include a commit statement thereby committing the transaction.

It should be noted that the transaction manager resides or operates at node 210-1 to which a client sends statements of a transaction (TR1). Alternatively, the transaction manager for a transaction (TR1) may be set to run on another node 210-2. In such configuration, the node 210-1 may propagate the statements to the node 210-2. In this example configuration, the transaction manager can manage a specific transaction (e.g., TR1). Other transaction managers manage other concurrently executed transactions. Typically, but not limited to, such transaction managers are spread across the cluster of nodes 210.

At S320, the creation of a point-in-time image (PiT) is initiated. In an embodiment, S320 occurs by the transaction manager when a PiT-based transaction begins. A PiT-based transaction may be utilized for repeatable-read isolation mode protocols, read-committed protocols, protocols that provide stronger isolation guarantees, specific moments during the transaction execution, a combination thereof, and the like. In an embodiment, an initiation of a PiT may be triggered when an execution of a task begins.

In an embodiment, to create the PIT, a PiT creation request is sent to the SEQ-agent. The SEQ-agent is configured to send such messages to the SEQ-server for the creation of the PiT. The SEQ-server is configured to increment the LTC where its value is returned as PiT creation timestamps by the SEQ-server to the SEQ-agent, and then from the SEQ-agent to the transaction manager. Various embodiments for creating the PiT are discussed in detail below.

It should be noted that causing the creation of a PiT at the beginning of a transaction or a statement is merely one example. A PiT can be created at any stage of the execution of the transaction or a statement. Once a PiT is created, an indication that the created PiT is ready is returned by the SEQ-agent 219. The PiT timestamp is also returned.

At S330, upon the reception of an indication that the PiT is ready, execution of statements and/or tasks by the respective agents is initiated. To this end, the timestamp of the PiT is provided to the agents. It should be noted that in this embodiment PiT is created in response to a statement initiating the transaction. The PiT is not created for each received statement.

According to some embodiments, during S330 execution of read and/or write operations may be performed. In an embodiment, the statements may include, but are not limited to, reading a data-cell or data-row (such as, PiT read and current read, etc.), writing to a data-cell or a data-row, modifying row, and the like. In an embodiment, the execution of a transaction's statements is performed by a transaction manager. The executions of read and write operations are discussed in detail below.

It should be noted that S330 is performed as long as the received statements require execution of a read operation, a write operation, or any operation that is not a commit. Upon receiving a commit statement, execution proceeds to S340. In the context of database transactions, a "commit" refers to the action of permanently saving all the changes made during the current transaction to the database. When a transaction is committed, all the operations within that transaction are made permanent and can be seen by other users and transactions. Until a transaction is committed, its changes are not visible to other users and transactions.

At S340, upon receiving a commit statement from the client, a commit process of the transaction (received at S310) is performed. Execution of the commit process is performed to ensure the ACID properties of the transaction. In an embodiment, during the commit process, the modifying transaction agent is configured to perform the actions necessary to turn its uncommitted row-versions into committed. Such actions are performed while the commit pauses taken by the modifying transaction agent are still acquired (i.e., prior to the commit pauses release). The execution of S340 is discussed in more detail with reference to FIG. 4.

It should be noted that typically a transaction is not purely executed inside the database 120. Instead, transaction execution is effectively a shared effort between the client and the underlying database, as the client can submit statements, perform algorithmic logic and, as a result, submit more statements, all as part of the same transaction. The CC-protocols used by the database can be very effective in enforcing how activities are being performed inside the underlying database. It, therefore, can be very effective in making those enforcements for the execution of the statements submitted by the client on behalf of the transaction. However, the database has limited abilities to dictate the behavior of the transaction algorithmic logic running on the client due to external behavior. Such an external behavior can sometimes completely break the level of ACID guaranties provided by the underlying database's CC-protocol in use for the transaction. For example, in a perfectly serializable isolation-level, when a client submits a statement that reads some data-cells, and the statement returns those read values to the client, while the transaction is still in progress. If the client communicates those read values outside of the logical scope of the transaction, the client may seriously violate the isolation-level guarantees it tries to achieve with that transaction (as those values must not be relied on at that stage in time (prior to the transaction commitment) by anybody else but that specific transaction). Therefore, it is generally expected that the client logic for the transaction will obey some general rules if it expects to achieve the exact isolation-level that is guaranteed by the underlying database' CC-protocol in use for the transaction.

Some database products support multiple different isolation-levels, supported by different CC-protocols (and/or different variations of the same CC-protocol). Furthermore, those databases often allow multiple transactions to run under different isolation-levels simultaneously, even if they access the same tables, rows, cells (or any other relevant data-object). Some databases can support multiple CC-protocols/isolation-levels, where multiple simultaneous transactions could choose their specific isolation-level.

It should be noted that there are cases where a database supports multiple different CC-protocols that all provide more-or-less (or exactly) the same isolation-level—those CC-protocols have different implementations and different performance characteristics. In such cases, the one of ordinary skill may choose the best-fitting CC-protocol for each of his transactions, based, for example, on his knowledge about which CC-protocol will perform best for each of his transactions. For example (and that example is specifically relevant for the disclosed embodiments), in environments that expect fully-serializable execution, it is sometimes better to execute read-only transactions using a PiT-based CC-protocol, while running the transactions that modify data-cells (e.g., read/write transactions) using a CC-protocol that allows serializable execution of such transactions (e.g., the 2PL CC-protocol). This way, the read-only transactions enjoy serializable execution while still not conflicting with the modifying transactions, and hence transaction concurrency is not hurt. This may be especially useful for long-running read-only transactions, such as the ones found, for example, in OLAP workloads.

The commit process performed at S340 supports different isolation levels and different CC protocols. At S350, a commit acknowledgment (ack) is returned to the client, thereby ending the execution of the received transaction.

Once a Point-in-Time (PiT) is no longer required because the transaction or statement using the PiT has completed its execution, the PiT can be removed. The removal of the PiT can be done asynchronously or deferred to a later time. After the removal of the PiT, some row-versions may become unnecessary. These row-versions are those that are not required anymore, as no PiT-read or current-read would access their data-cells. Such unneeded row-versions can then be removed. The removal of these row-versions can take place asynchronously or deferred to a later time.

According to the disclosed embodiments, write operations are performed by a transaction agent on a node by writing data to one or more data cells or data row(s) in an uncommitted manner. Following are a few different sub-cases where a transaction agent writes to a data-cell/data-row, as part of a transaction (TR1) execution:

Insert a new row: this occurs when the transaction agent needs to insert a new row to the database, a new row with a single row-version representing that insertion is added to the MVCC storage.

Modify a row, including modification of a data-cell, a set of data-cells that belongs to the same row, or the entire row, where the transaction modifies that specific row for the first time since the transaction started. When data is written for the first time, a new row-version of the existing row is added to MVCC storage. Typically, the content of that row-version can be a "baseline" content, with the modifications applied. Depending on the CC-protocol in use, that baseline content can be the content of the currently-committed content of that row, or the content of that row in the transaction's PiT, etc. It should be noted that the disclosed embodiments are applicable regardless of what CC-protocol is in use and, hence, regardless of how that baseline content is determined.

Another sub-case of a write operation is a modification of a row after the row has already been written by the transaction. For example, when a transaction (TR1) has already added a new row (e.g., R100) to the database and/or transaction (TR1) has already modified (R100). It should be noted that when the transaction-agent executing TR1 needs to modify a data-cell of row (R100) during the execution of transaction TR1, a set of data-cells belonging to (R100), or the entire R100, that is, the case where the row is modified "not for the first time" by TR1. In that case, no new row-version is added. Instead, the row-version that was already added is modified.

Generally, for all sub-cases of the write operations at the moment the row-version is updated, the transaction is not yet committed. Therefore, the row-version is initially an uncommitted one. As such, uncommitted row-versions are generally ignored by read operations of other transactions.

It should be noted that the write operations discussed herein are agnostic to the type of the storage or the data-layout, CC protocol, and/or isolation level implemented by the database.

According to the disclosed embodiments, read operations are performed by a transaction agent on a node by reading either from the latest committed row-versions (referred to as a "current read") or from a PiT (referred to as a PiT read). The read operations are from one or more data cells that belong to the same row or an entire row. To support the PiT read and ensure consistency, the MVCC is configured to allow row versioning. In an embodiment, each row version includes a timestamp that may be included or be part of a row version's metadata.

The row versioning and the usage of row versions in PiT read and current read operations are explained via the following example (hereinafter "Example 1"):

a. at time t10, the (committed) value of a row R1 is val1 and the value of row R2 is val10;
b. PiT image P1 is created at time t20;
c. Row R1 is modified (in a committed manner) at time t30 to have the value val2 (row R2 is not modified);
d. PiT image P2 is created at time t40;
e. Row R1 is modified (in a committed manner) at time t50 to have the value val3; and
f. Row R2 is modified (in a committed manner) at time t51 to have the value val11.

In Example 1, PiTs P1 and P2 were not yet removed. It should be noted that timestamps are represented by the letter "t" followed by a numerical value such as "t10", "t15", and "t20". This notation does not indicate specific time values but implies that 'tn' is greater than 'tm' if 'n' is greater than 'm'. For instance, 't20' occurs after 't15', which occurs after 't10'. Moreover, the numerical value does not signify the exact time difference between timestamps. Thus, the time difference between 't20' and 't15' is not necessarily the same as the time difference between 't15' and 't10'.

At time t60, the transactions may need to read R1 from PiT P1 (val1) and/or from PiT P2 (val2) and/or need to read the currently-committed, most up-to-date, value of R1 (val3), depending on the isolation-level the specific transaction is using, the pertinent CC-protocol details, and the specific PiT that transaction is using (if it uses a CC-protocol that is PiT-based). The values val1, val2 and val3 are referred to as 3 different versions of the same row R1. If, at t60, the database does not contain/store val1, then it may be impossible to read row R1 under PiT P1 (or, in other words, PiT P1 is not fully achieved). Val2 is required for reading row R1 under PiT P2, and val3 is required for the transactions that try to read the current version of row R1 (e.g., because they use a non-PiT-based CC-protocol). In addition, val3 is required if a new PiT will be created at a point in time that is later than t50 (and is earlier than the point in time in which DC1 will be modified again-if any), as that PiT will have row R1 having val3.

At time t45, row R2 had only one row version, even though two PiTs were created. That row version contains the value val10. At time t45, the value val10 will be returned to a transaction that reads row R2 under PiT P1, as well as to a transaction that reads row R2 under PiT P2, as well as to a transaction that reads the current version (at time t45) of row R2. At time t60, val10 will still be the value returned if a transaction reads row R2 under PiT P1 or P2. However, if at time t60 the transaction reads the current version of row R2, it will receive the value val11. Starting at time t51, row R2 has two different row versions.

It should be noted that there is another case that is worth mentioning. The deletion of a row is a special case of "writing". For example, a data-row R1 was added by a transaction that committed at time t100, and the data-row R1 is deleted by a transaction that committed at time t120. Further, at t120 there is a still existing PiT P110 created for time t110. Therefore, clearly, the pertinent row-version for t100 cannot be removed from the data stored by the database (as it's required by P110). However, any reader for a PiT later than t120, as well as any "current" reader at a time greater than t120 that reads any of the row's data-cells should receive a "row (or data-cell) not found" result.

It should be noted that multiple row versions can be utilized even without the existence of PiTs. For example, suppose a row R100 has the currently committed value of val0. Suppose transaction TR1 modifies R100 to contain the value val1 and has not yet committed. Some databases may store the content of the uncommitted modification (val1) as an uncommitted row-version on the "main" database data-layout. Alternatively, some databases may store the content of the uncommitted modification val1 onto some sort of a persistent write-ahead log data-layout (and later on, for example, after TR1's commitment took place, copy val1 into the main database as a committed row-version). Especially for the former case, viewing the two values (val0 and val1) as two different versions of row R100 is useful. In addition, it is useful to refer to val1 as an Uncommitted Version (until TR1 commits). Just after TR1's commitment, val1 is considered as a Committed Version of R100 (and as the most current one), regardless of how the previously committed row version of R100 (val0) is handled by the database. By the lack of a PiT, val0 will become an unneeded row-version and, therefore, can be removed. Since the removal of the previous row-version (val0) will typically be performed asynchronously and later than the commitment of TR1, there will typically be a period in time where both val0 and val1 can be stored in the database as two committed row-versions, where val1 is the current, up-to-date one. The database is configured to address any further current-reads of R100 correctly, i.e., it should return val1 and not val0.

Further, some databases allow two (or more) transactions, TR1 and TR2, to perform modifications to the same row (e.g., row R100–val1 and val2, correspondently) where those modifications take place during an overlapping period of TR1's and TR2's execution. While those modifications may conflict with each other, there are cases (for example, there may be concurrency-control protocols) where that can be allowed without violating even the strongest serializable isolation-level. In such cases, the database may have multiple simultaneous uncommitted versions of row R100. TR1 may modify R100 earlier in time (e.g., at time t10) than TR2's modification (e.g., at t20) and yet TR2 may still commit before TR1 (e.g., TR2 commits at t30 and TR1 at t40). When modifications occur at two different points in time (t10 and t20), the database and the modifying transactions are usually unaware of which transaction will commit first. Therefore, it is impossible to determine the order of versions when they become committed.

As noted above, there are two types (sub-cases) of a read operation: a PiT read and a current read. The determination of which sub-case to use is typically based on the isolation level required for the transaction. It should be noted that all read operations are from the database (MVCC storage), but the different sub-cases determine a reference timeline to read the respective data-cells from.

Specifically, for a PiT read, to read a data-cell, its respective row is identified, and the data is read from the latest (committed) row-version that is earlier than the PiT's timestamp created for the transaction. As mentioned before, the read operation is performed by a transaction agent that receives PiT timestamps from its transaction manager which received it from the SEQ-agent.

Following Example 1, at t60, a read operation by a transaction (TR1) is to read the value of row R1 at a PiT P2. The transaction agent determines that the timestamp of P2 is t40. As a result, val2 is read. The transaction agent is configured to determine the latest row-version of R1 that is earlier than the timestamp of P2.

In a current read, the transaction agent is configured to read the current-committed content of a data-cell, a set of data-cells that belong to the same row, or the entire row. To this end, the transaction agent is configured to read the committed row-version with the latest timestamp out of all the respective row's committed row-versions.

It should be noted that under most CC-protocols, it is often required to support that if transaction TR1 already modified a data-cell DC1, then this "uncommitted" version of DC1 should be returned should TR1 read that data-cell later on during its execution. In other words, in many cases, the results of the read of a data-cell, a set of data-cells that belong to the same row, or the entire row should be performed according to the description given in the previous paragraphs but should be further amended by the contents that were already modified by TR1, if any.

It should be further noted that for the data-cell read to be correct, it is required that the latest version of the respective row (e.g., on node N2 in the above-mentioned scenario) that was committed with a CMTS, earlier than PiT's timestamp to already appear and be available in the MVCC data-layout on node N2. This is further described with reference to FIG. 4.

Figure 4:
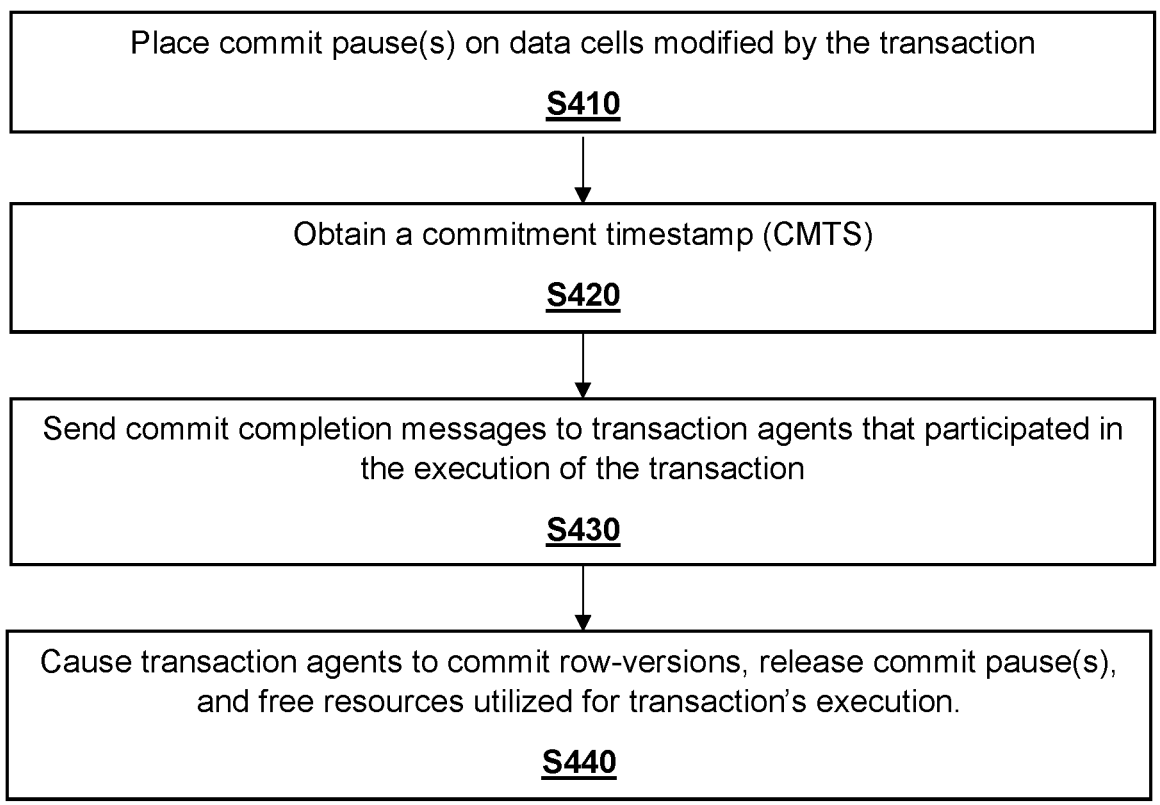
FIG. 4 is a flowchart of a method of operation of a transaction manager executed on a node for a commitment of a transaction according to an embodiment.

FIG. 4 is an example flowchart 400 of a commitment process S340 according to an embodiment. The process S340 can be managed by a transaction manager.

A commitment process in most database systems typically complies with one, some, or all of the following properties: abort-ability, visibility of modifications, atomicity of modifications, durability, and reporting order of commitments. One of the ordinary skills would be familiar with such properties. The disclosed embodiments apply to all database systems regardless of the properties being implemented or supported by the database system, especially in distributed database systems.

In order to support a distributed database, the commitment process is atomic, or a distributed atomic commitment. The transactions modifying data-cells need to perform an atomic distributed commitment where the modified data-cells become visible to further reads and/or PiTs immediately after the commitment.

At S410, a commit pause is placed on each data cell modified through the execution of the transaction. Typically, prior to placing commit pauses and depending on the exact CC-protocol and the exact database architecture and implementation, a transaction may need to perform various activities after the transaction completed its "working phase" (S330) and before the transaction can be considered "committed." That is, commit pauses can be placed gradually, and either earlier (e.g., during the transaction working phase) or later (e.g., after the transaction completed its main working phase and as an initial part (or "preparation") of the commitment.

The commit pauses are required to achieve atomicity in a distributed transaction commitment, the data-cells/data-rows that were modified need to become (at least momentarily) inaccessible prior to the commitment and, after the commitment, should become accessible again. Generally, even if the data-cells are gradually becoming inaccessible prior to the commitment and are gradually becoming accessible after the commitment, the atomicity is achieved depending on the general principles of the CC-protocol in use. For example, in some CC-protocols, the modified data-cells become inaccessible (for transactions other than TR1) earlier, during the transaction working phase.

To achieve the desired atomicity of the commitment regardless of the CC-protocol in use, the modifying transaction agents (or the modifying agent) may acquire commit pause for all their modified data-cells, or they may wait for the transaction manager to instruct them to acquire such commit pauses. Once all the modifying transaction agents hold the relevant commit pauses, the transaction reaches the "atomicity period" or "atomicity barrier" where it could safely proceed with its commitment.

In an embodiment, the commit pause is placed by a transaction agent modifying a data-cell on the data-cell. For example, a transaction agent TR1 has a modifying transaction agent in node N1 (TR1-AG1) that modifies data-cell DC1 (in node N1). When TR1-AG1 acquires a commit pause on DC1, there is a commit pause on DC1 on behalf of TR1-AG1. When TR1-AG1 releases that commit pause, there is no longer a commit pause on DC1 by TR1-AG1. Further, another modifying transaction agent, e.g., TR2-AG1, that is, a modifying transaction agent of TR2 running in node N1 may acquire (as well as later on release) a commit pause of DC1. This can be achieved in an unrelated manner to the commit pause taken by TR1-AG1. For example, if both TR1-AG1 and TR2-AG1 hold a commit pause on DC1, then if the TR1-AG1 releases that commit pause, then TR2-AG1 still holds its commit pause on DC1. It should be noted that a commit pause can be placed on other "data units", such as a data-row, a storage page, a storage object, and the like.

At S420, a commitment timestamp (CMTS) is obtained. In an embodiment, the CMTS is a logical time, such as an increasing sequence number. However, other forms of timestamps, such as those described with reference to LTC are applicable as well.

To obtain the CMTS, the SEQ-agent is called by the transaction manager to provide the CMTS. To this end, the SEQ-agent communicates with the SEQ-server to retrieve a timestamp. Once the CMTS creation is completed, by the SEQ-server, the SEQ-server provides the CTMS' value to the SEQ-agent, and the SEQ-agent returns this value to the transaction manager, indicating that the CMTS is ready. The various embodiments for creating and communicating the CTMS are discussed in detail below. The process (S420) should be performed within the "atomicity period" of the commitment process. The atomicity period is the time duration between the acquisition and release of the commit pause. Various embodiments for creating the CMTS by the SEQ-server and SEQ-agent are discussed in more detail below.

At S430, commit completion messages containing the created CMTS are sent to transaction managers that have modified data cells. The commit completion messages may also be sent to "non-modifying transaction agent". A non-modifying transaction agent is a transaction agent that has not modified a data cell.

At S440, the commitment of data cells is performed. Specifically, S440 includes causing transaction agents to commit row-versions that were modified by the committing transaction.

According to the disclosed embodiments, S440 ensures that immediately after the transaction (TR1) commits, the row-versions must immediately turn into committed ones, as well as coupled with the transaction's CMTS. Otherwise, a following read operation (by another transaction, either for a specific PiT or a "read the most current version" (hereafter Current-Read) request) may erroneously skip that row-version.

In an embodiment, committing a row-version includes modifying the CMTS metadata of all the new row-versions generated by the committing transaction during and as part of the commitment.

In another embodiment, the CMTS is not modified during commitment. When the uncommitted row-version is added (during the writing transaction working phase), the MVCC data-layout should not represent that row-version with a CMTS, since the CMTS for the pertinent transaction has not yet been created yet as that transaction has not yet committed. Instead, the row-version is represented with a Transaction ID. A Transaction ID is a unique identifier that will uniquely identify the transaction inside the pertinent node. The Transaction ID (TID) and the corresponding CMTS are saved in a TID-to-CMTS mapping table. Such a mapping table is saved in a respective node on which the transaction is executed. The TID-to-CMTS mapping table may or may not be a persistent data-structure. The CMTS value may be a null value if the transaction is still uncommitted. It should be noted that the mapping table can be represented or realized in any form of a data structure.

In an embodiment, whenever the node becomes part of transaction execution, or, more specifically, if the transaction creates an uncommitted row-version in that node, the respective transaction ID is added to the TID-to-CMTS mapping table, where the initial CMTS is set to NULL (i.e., "uncommitted"). During and as part of the transaction's commitment, the transaction's TID-to-CMTS entry is modified to contain a transaction ID's CMTS (instead of NULL). It should be noted that this is a single modification activity, regardless of how many row-versions are created by the transaction in that node. Therefore, modifying an entry in the TID-to-CMTS mapping table will not prolong the commitment duration.

It should be noted that when a transaction agent reads a row version, which can either be the most up-to-date version or a point-in-time version, the multi-version concurrency control (MVCC) data layout should also consider the row versions that are marked with transaction IDs instead of commit timestamps (CMTS). For each such row version, the CMTS should be resolved by accessing the relevant TID-to-CMTS entry, or by understanding that the row version is still uncommitted.

In an embodiment, to reduce the size of the TID-to-CMTS mapping table, after the writing transaction (TR1) commitment, for all the row-versions created by the committed transaction, the transaction ID indications are replaced by the transaction's CMTS. Once all TR1's created row-versions are treated, the transaction's entry in the TID-to-CMTS can be removed. This way, the TID-to-CMTS mapping table will generally hold only recent transactions and its size will be maintained at a certain size. In an embodiment, the process for updating the TID-to-CMTS may be performed as an asynchronous lazy background task.

In an embodiment, S440 also includes causing the modifying transaction agents releasing commit pauses and free resources allocated and/or utilized for transaction's execution, as well as performing any further actions required by the database mechanism including the concurrency-control protocol that is in use. The release of the commit pauses takes place once the commitment of row-versions is completed. The commit completion messages may also be sent to the transaction's non-modifying transaction agents, indicating to such agents that they may perform similar resource cleanup and any required operations as described above. Generally, and depending on the concurrency-control protocol in use, if a transaction agent of, e.g., transaction, TR5 (hereafter the Reading Agent) attempts to read a data-cell for which another transaction (e.g., TR1) is currently holding a commit pause, then the reading agent should wait with the reading of that data-cell until the commit pause is removed. This wait time may be required for resolving some race-conditions that may be relevant, subject to the concurrency-control protocol that is in use.

Figure 5:
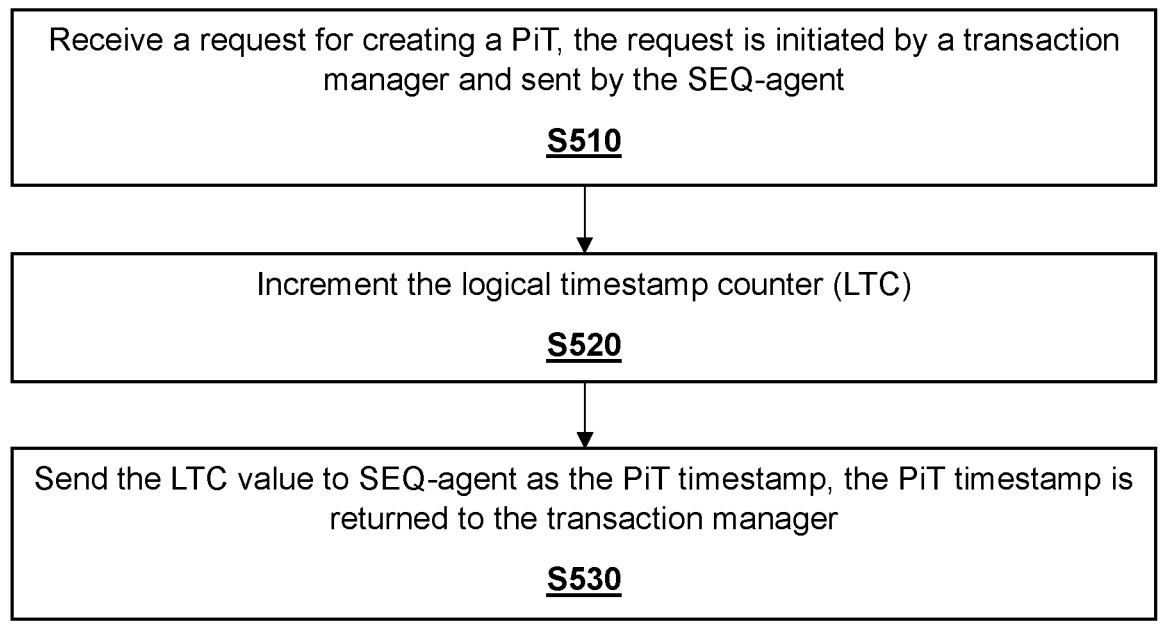
FIG. 5 is a flowchart of a process of creating a PiT, according to an embodiment.

FIG. 5 shows an example flowchart 500 describing a process of creating a PiT, according to an embodiment. In an embodiment, the process of creating a PiT is performed by the SEQ-server.

At S510, a request for creating a PiT is received. In an embodiment, the request is initiated by a transaction manager and sent by a SEQ-agent to the SEQ-server. If multiple requests arrive at the SEQ-server, the SEQ-server handles each request atomically.

At S520, upon reception of the request, the logical timestamp counter (LTC) is incremented. In an embodiment, any counter can be used to generate monotonically increasing LTCs. It should be noted that the LTC can be realized as an integer counter, a timer, a register, and the like. Further, the LTC can be incremented by one or increased by any arbitrary number.

At S530, the incremented LTC value is sent to the SEQ-agent as the PiT timestamp. In response, the PiT timestamp is returned to the transaction manager. Following the completion of the PiT creation, the transaction is configured to process statements, for example, start reading data-cells.

It should be appreciated that a process described with reference to FIG. 5 allows for the creation of the PiT with a pair of request and response messages communicated with the SEQ-server. Further, there is no need to synchronize the creation of PiT, and thus exchange messages with other nodes in the cluster of nodes.

Figure 6:
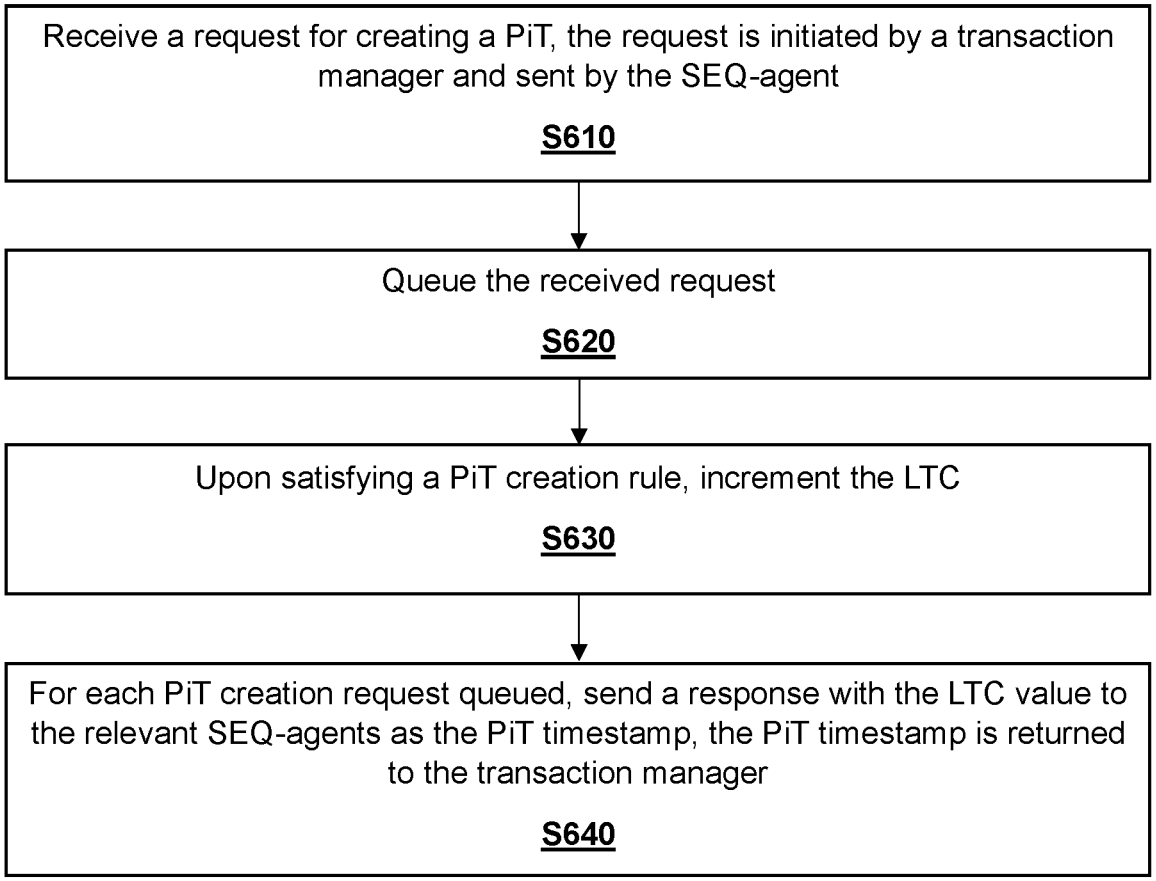
FIG. 6 is a flowchart of a process of creating a unified PiT, according to an embodiment.

FIG. 6 shows an example flowchart 600 describing a process of creating a PiT, according to another embodiment. In an embodiment, the process illustrated in FIG. 6 is performed by the SEQ-server. In some instances, the SEQ-server is configured to asynchronously stream information about PiTs to all the nodes, for example, in order to remove unneeded row-versions. In some instances, it is desired to reduce the number of PiTs taken. Therefore, according to the disclosed embodiments, a single PiT (hereinafter a "Unified PiT") is created to be utilized by multiple different transactions.

At S610, a request for creating a PiT is received. In an embodiment, the request is initiated by a transaction manager and is sent by the SEQ-agent to the SEQ-server.

At S620, the received request is queued by the SEQ-server. In some embodiments, multiple requests are received for multiple transactions executed, either in the same node or a different node. That is, at S620, one or more PiT creation requests initiated by one or more transaction managers are queued.

At S630, upon satisfying a PiT creation rule, the LTC is incremented. In an example embodiment, the PiT creation rule may include a predetermined number of PiT creation requests, a predetermined time window, and the like, or a combination thereof. For example, a rule may include an increment of the LTC every 1 msec (and as long as there is a pending request) or 1500 requests, whichever comes first.

At S640, for each queued PiT creation request, a response with the incremented LTC value is sent to the respective SEQ-agent as the PiT timestamp. In response, the SEQ-agent is configured to return the unified PiT timestamp to the transaction manager. The transaction manager then views the PiT creation as completed and is configured to start processing the transaction. It should be noted that a transaction manager waiting for PiT creation can perform a limited set of tasks (e.g., parsing a command) for the transaction execution.

In some instances, multiple queued PiT creation requests arrive from the same SEQ-agent. Here, the SEQ-server can aggregate any and all of the responses from the same SEQ-agent into a single message. Upon reception of such responses, the SEQ-agent is configured to return the unified PiT timestamp to the respective transaction managers.

In certain embodiments, the SEQ-server is configured to select a subset of the queued PiT-creation requests for the unified PiT creation, leaving the unselected requests to a future unified PiT creation. It should be noted that the order in which SEQ-server receives the PiT creation requests is not necessarily the order in which such requests are included the subset for unified PiT creation.

Figure 7:
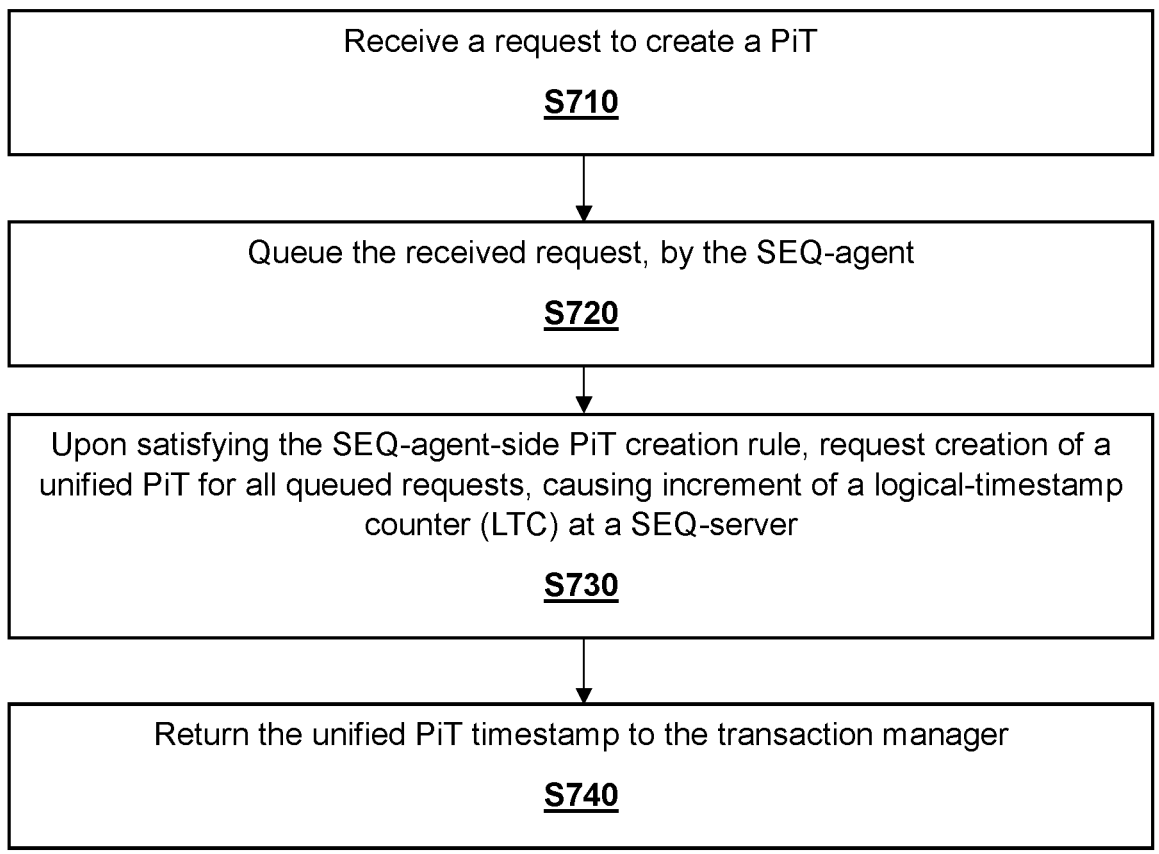
FIG. 7 is a flowchart of a process of creating a unified PiT, according to another embodiment.

FIG. 7 shows an example flowchart 700 describing a process of creating a PiT, according to another embodiment. The process of creating a PiT is performed by the SEQ-agent.

At S710, a request to create a PiT for a transaction is received by an SEQ-agent from a transaction manager.

At S720, the received PiT creation request is queued by the SEQ-agent. In some embodiments, a SEQ-server may receive and queue multiple PiT creation requests from different SEQ-agents, as well as multiple PiT creation requests from the same agent. According to an embodiment, SEQ-agents can choose a strategy for queuing and submitting PiT creation requests to the SEQ-server.

In an embodiment, such a strategy is denoted here as an "SEQ-agent-side PiT creation rule". In an example embodiment, the SEQ-agent-side PiT creation rule may include the following: when the "first" transaction manager calls the SEQ-agent, a PiT creation request is sent to the SEQ-server. Then, any further requests to that SEQ-agent from transaction managers are queued until a response from the SEQ server is received indicating that a unified PiT has been created. After receiving the response, another PiT creation request is sent for all the aggregated requests (if any) to the SEQ-server. If there are no aggregated requests, the message is sent only when a transaction manager calls SEQ-agent requesting a PiT creation.

At S730, upon satisfying the SEQ-agent-side PiT creation rule, a single PiT creation request is sent to the SEQ-server for the creation of a unified PiT for all requests queued by the SEQ-agent. Once that request is received by SEQ-server, it may be subject to further queuing at the SEQ-server side (e.g., similarly to as described in S620 and S630). In an embodiment, such queuing operation may be as a result of a PiT creation rule at the SEQ-server side (hereinafter denoted also as the "SEQ-server-side PiT creation rule"). Upon satisfying the SEQ-server-side PiT creation rule, the LTC at the SEQ-server is incremented, thereby creating a unified PiT. It should be noted that such a created unified PiT may serve multiple unified PiT creation requests sent by multiple SEQ-agents.

After a unified PiT is created, the SEQ-server may still send an aggregated response for each requesting SEQ-agent, aggregating multiple PiT creation requests. In some embodiments, the identity of the exact transactions requesting the PiT creation is not required in the PiT creation request. However, in some embodiments, the number of transactions (and or of the non-unified PiTs) may be required for various reasons (i.e., the transactions may be incorporated into a strategy of the SEQ-server regarding when to create a unified PiT, etc.).

At S740, the unified PiT is returned by the SEQ-agent to the transaction manager. In an embodiment, the unified PiT timestamp is returned to all the transaction managers that were part of any PiT creation request related to the response. Following such return, the transactions view the PiT creation as completed and their transaction agents are configured to process statements, for example, start reading data-cells.

It should be noted that the embodiment discussed in FIG. 7 further reduces the number of messages exchanged between the SEQ-agents and SEQ-server. In some embodiments, the process discussed in FIG. 7 can be scalable for a large number of PiT creation requests. In an embodiment, a cluster of SEQ-agents with a predefined hierarchy can be utilized to support increasing demand for PiT creation requests. That is, a hierarchy of SEQ-agents is created where multiple SEQ-agents send their request to a single parent SEQ-Agent, and there are multiple parent SEQ-agents available. Such parent SEQ-agents perform similar aggregation as the SEQ-agent and pass those aggregated requests to SEQ-server, thus meaningfully reducing the incoming number and rate of messages to SEQ-server. Similarly, the number and rate of response messages from SEQ-server are reduced as SEQ-server sends those to the parent SEQ-agents, which then send responses to the SEQ-agents.

FIG. 8 shows an example flowchart 800 describing a process of creating a CMTS, according to an embodiment. In an embodiment, the process of creating a CMTS is performed by the SEQ-server.

At S810, a request for creating a CMTS is received. In an embodiment, the request is initiated by a transaction manager and sent by a SEQ-agent to the SEQ-server. If multiple requests arrive at the SEQ-server, the SEQ-server handles each request atomically.

At S820, upon reception of the request, the LTC is incremented. In an embodiment, any counter is used to generate monotonically increasing LTCs. It should be noted that the LTC can be realized as an integer counter, a timer, a register, and the like. Further, the LTC can be increased by one or increased by any arbitrary number.

At S830, the incremented LTC value is sent to the SEQ-agent as the CMTS. In response, the CMTS' value is returned to the transaction manager as a transaction commitment timestamp.

It should be appreciated that a process described with reference to FIG. 8 allows for the creation of the CMTS with a pair of request and response messages communicated with the SEQ-server. Further, the actual CMTS allocation does not require synchronizing or coordination with any other node in the cluster of nodes. Further, once the CMTS is received by the committing transaction manager, the continuation of the commitment involves only updating the nodes that participate in the transaction execution, and there is no need to update nodes that do not participate in the transaction commitment.

Figure 9:
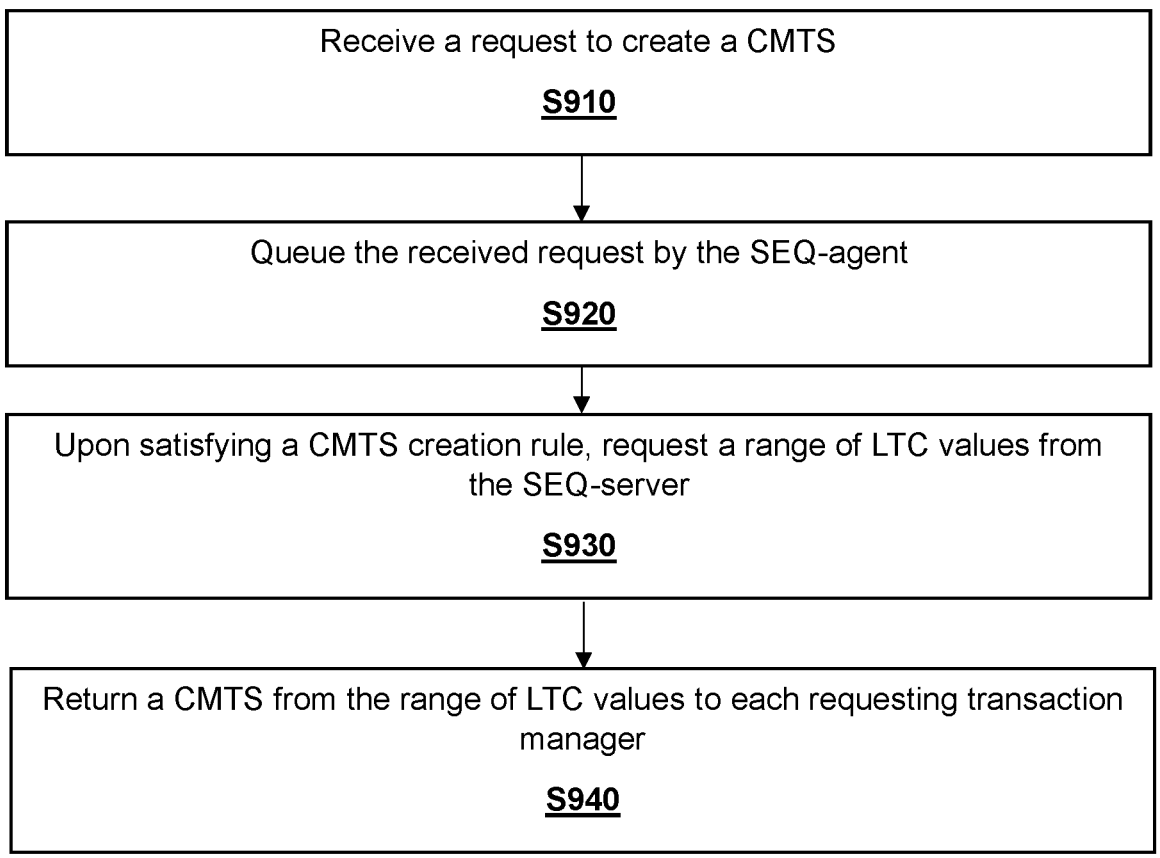
FIG. 9 is a flowchart of a process of creating a CMTS, according to another embodiment.

FIG. 9 shows an example flowchart 900 describing a process of creating a CMTS, according to another embodiment. The process of creating a CMTS as shown in FIG. 9 is performed by the SEQ-agent.

At S910, a request to create a CMTS to commit a transaction is received by an SEQ-agent from a transaction manager.

At S920, the received CMTS creation request is queued by the SEQ-agent. The SEQ-agent counts the number of queued CMTS requests.

At S930, upon satisfying a CMTS creation rule, a single CMTS creation request is sent to the SEQ-server. The CMTS creation request specifies the number of CMTS requests queued by the SEQ-agent and are to be served by the SEQ-server. In response to the received request, as discussed below, the LTC at a SEQ-server is increased to provide a CMTS' value. The CMTS creation rule may include a predetermined time window, a combination of a predetermined time window and, a number of queued CMTS creation requests, and the like. For example, a CMTS creation rule may include a submission of a CMTS creation request to the SEQ-server every 1 msec (and as long as there is a queued request) or 1500 queued requests, whichever comes first. Additionally, such a CMTS creation rule may be further amended such that the SEQ-agent will not send a new CMTS creation request to SEQ-server if there is already such a request that was sent by the SEQ-agent and has not yet been responded to by SEQ-server, etc.

It should be noted that when the SEQ-server receives a CMTS request, it generally processes it immediately (i.e., without queuing). The SEQ server increases LTC with that number N (where N is the number of queued CMTS requests specified by the SEQ agent). The SEQ-server returns N CMTSs representing a range of the previous value of LTC+1 to LTC+N. For example, if LTC is 100 and the SEQ-server receives a CMTS creation message with N=4, the SEQ-server increases LTC to 104 (=100+4) and returns "101 . . . 104", representing 101, 102, 103, 104.

At S940, a CMTS value from the received range of CMTS values is returned by the SEQ-agent to each transaction manager requesting the creation of CMTS. Note that each such transaction manager would receive a different CMTS value.

It should be noted that the embodiment discussed in FIG. 9 further reduces the number of messages exchanged between the SEQ-agents and SEQ-server.

In some embodiments, the process discussed in FIG. 9 can be scalable for a large number of CMTS creation requests. In an embodiment, a cluster of SEQ-agents with a predefined hierarchy can be utilized to support increasing demand for CMTS creation requests. Here, a range of CMTS values are returned to each cluster. In an embodiment, a cluster of SEQ-agents with a predefined hierarchy can be utilized to support increasing demand for CMTS creation requests. That is, a hierarchy of SEQ-agents is created where multiple SEQ-agents send their request to a single parent SEQ-agent, and there are multiple parent SEQ-agents available. Such parent SEQ-agents perform similar aggregation as the SEQ-agent and pass those aggregated requests to SEQ-server, thus meaningfully reducing the incoming number and rate of messages to SEQ-server. Similarly, the number and rate of response messages from SEQ-server are reduced as SEQ-server sends those to the parent SEQ-agents, which then send responses to the SEQ-agents.

Figure 10:
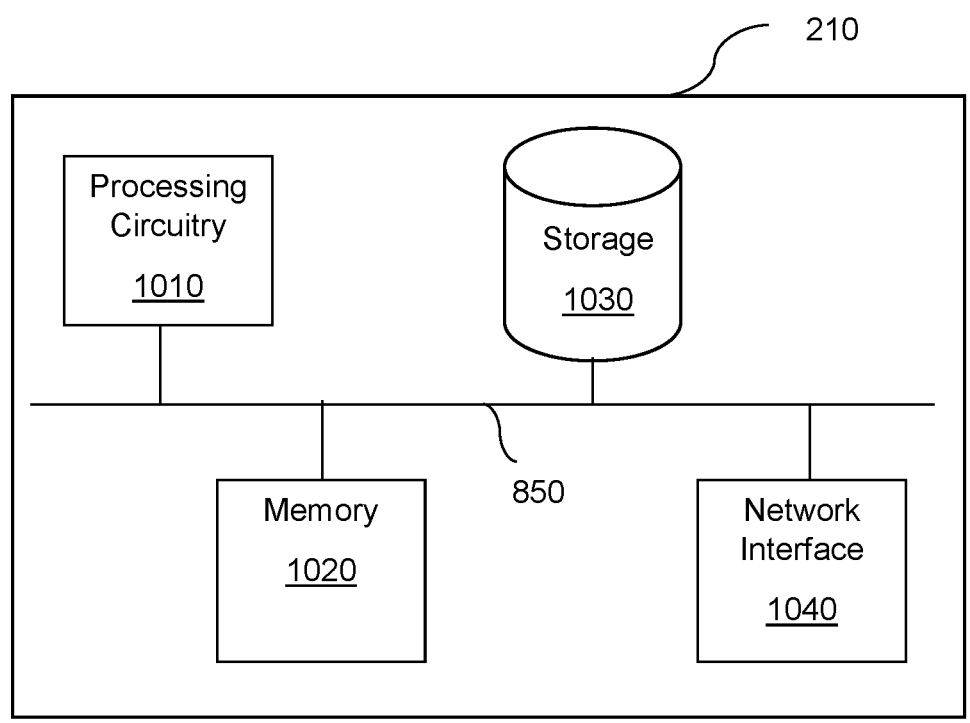
FIG. 10 is a schematic diagram of a controller according to an embodiment.

FIG. 10 is an example schematic diagram of a hardware layer of a node 210 in a database 120 according to an embodiment. The node 210 includes a processing circuitry 1010 coupled to a memory 1020, a storage 1030, and a network interface 1040. In an embodiment, the components of the node 210 may be communicatively connected via a bus 1050.

The processing circuitry 1010 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1020 may be volatile (e.g., random access memory, etc.), non-volatile (e.g., read only memory, flash memory, etc.), or a combination thereof.

In one configuration, software for implementing one or more embodiments disclosed herein may be stored in the storage 1030. In another configuration, the memory 1020 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1010, cause the processing circuitry 1010 to perform the various processes described herein.

The storage 1030 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1040 allows the node to communicate with, for example, other nodes or with a transaction manager. It should be understood that the embodiments described herein are not limited to the specific architecture illustrated in FIG. 10, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone, B alone; C alone; A and B in combination; B and C in combination; A and C in combination; or A, B, and C in combination.

What is claimed is:

1. A method for managing execution of database transactions by facilitating point-in-time image (PiT), comprising:
    receiving at least one statement being part of a transaction, wherein the transaction is initiated by a client to be executed on a distributed database system;
    sending a single request to a sequencer server (SEQ-server) to create at least one PiT, wherein the SEQ-server provides a logical timestamp counter (LTC) value as a timestamp of the PiT;
    upon creation of the at least one PiT, causing execution of the at least one statement, wherein a PiT provides a state and content of committed data in the distributed database system;
    upon receiving a commit statement, performing a commitment process of the transaction, wherein the commitment process is based on a commitment timestamp (CMTS) set by the SEQ-server based on an incremented value of the LTC; and
    returning an acknowledgment of the transaction commitment to the client.

2. The method of claim 1, initiating the creation of the at least one PiT further comprises:
    receiving the single PiT creation request from an SEQ-agent, wherein the PiT creation request is initiated by a transaction manager executing the transaction;
    upon receiving of the creation request, incrementing the LTC value; and
    sending the incremented LTC value to the SEQ-agent as a PiT timestamp, wherein the PiT timestamp is returned to the transaction manager.

3. The method of claim 1, wherein initiating the creation of the at least one PiT further comprises:
    receiving a PiT creation request from an SEQ-agent, wherein the PiT creation request is initiated by a transaction manager executing the transaction;
    queuing the received PiT request in the SEQ-server;
    upon satisfying a PiT creation rule, incrementing the LTC value; and
    sending the incremented LTC value to the SEQ-agent as a PiT timestamp, wherein the PiT timestamp is returned to the transaction manager.

4. The method of claim 3, further comprising:
    receiving a plurality of PiT creation requests from a plurality of SEQ-agents; and
    for each queued PiT creation request, sending a response with the incremented LTC value to a respective SEQ-agent as the PiT timestamp.

5. The method of claim 4, wherein the PiT creation rule includes any one of: a predetermined number of PiT creation requests, a predetermined time window, or both.

6. The method of claim 1, wherein initiating the creation of the at least one PiT further comprises:
    receiving a PiT creation request at an SEQ-agent, wherein the PiT creation request is initiated by a transaction manager executing the transaction;
    queuing the received PiT request in the SEQ-agent;
    upon satisfying a SEQ-agent-side PiT creation rule, sending a single unified PiT creation request to the SEQ-server to create a unified PiT for all requests queued in the SEQ-agent; and
    receiving the incremented LTC value as a unified PiT timestamp, wherein the unified PiT timestamp is returned to the transaction manager.

7. The method of claim 6, further comprising:
    receiving a plurality of PiT creation requests from a plurality of transaction managers; and
    for each queued PiT creation request, sending a response with the unified PiT timestamp to a respective transaction manager.

8. The method of claim 7, further comprising:
    queuing the unified PiT creation request in the SEQ-server; and
    upon satisfying a SEQ-server-side PiT creation rule, incrementing the LTC value, thereby creating a unified PiT timestamp, wherein the created unified PiT timestamp serves multiple unified PiT creation requests sent by a plurality of SEQ-agents.

9. The method of claim 8, the SEQ-server-side PiT creation rule includes any one of: a predetermined number of PiT creation requests, a predetermined time window, or both, wherein the SEQ-server-side PiT creation rule is triggered when a first transaction manager of the plurality of transaction managers calls the SEQ-agent.

10. The method of claim 1, further comprising:
    generating the CMTS based on the incremented value of the LTC.

11. The method of claim 10, further comprising:
    receiving a CMTS creation request from an SEQ-agent, wherein the CMTS creation request is initiated by a transaction manager executing the transaction;
    upon reception of the creation request, incrementing the LTC value; and
    sending the incremented LTC value to the SEQ-agent as the CMTS, wherein the CMTS is returned to the transaction manager.

12. The method of claim 10, further comprising:
    receiving a CMTS creation request at an SEQ-agent, wherein the CMTS creation request is initiated by a transaction manager executing the transaction;

queuing the received CMTS request in the SEQ-agent;
counting the queued CMTS requests;
upon satisfying a CMTS creation rule, sending a single CMTS creation request, wherein the single CMTS creation request specifies a number of queued CMTS requests; and
receiving a range of LTC values as CMTSs.

13. The method of claim 12, further comprising:
receiving a plurality of CMTS creation requests from a plurality of transaction managers; and
for each queued CMTS creation request, sending a response to a respective transaction manager with a CMTS from the received CMTSs, wherein each of the plurality of transaction managers receives a different CMTS.

14. The method of claim 12, wherein the CMTS creation rule includes any one of: a predetermined number of CMTS creation requests, a predetermined time window, or both.

15. The method of claim 1, wherein performing the commitment process of the transaction further comprises:
placing a commit pause on each data cell modified by the transaction;
obtaining the CMTS;
sending a commit completion message to a transaction agent that participated in the execution of the transaction; and
causing the transaction agent to commit row-versions and release any commit pause.

16. The method of claim 1, wherein causing the execution of the at least one statement further comprises performing any one of: a write operation and a read operation.

17. The method of claim 16, wherein performing the read operation further comprises:
reading data from at least the created PiT.

18. The method of claim 16, wherein performing the read operation further comprises:
when data has changed after the creation of the PiT, reading data from at least a latest committed row-version.

19. The method of claim 16, wherein performing the write operation further comprises:
writing data to at least one data cell in an uncommitted manner.

20. The method of claim 1, wherein the distributed database system comprises: one SEQ-server and a plurality of SEQ-agents executed on a plurality of nodes of the distributed database system, wherein each of the plurality of nodes incudes a storage implementing a persistent data-layout that allows multi-version data-cells.

21. The method of claim 20, wherein the plurality of SEQ-agents are configured at a predefined hierarchy.

22. A system for managing execution of database transactions by facilitating point-in-time image (PiT) comprising:
one or more processors configured to:
receive at least one statement being part of a transaction, wherein the transaction is initiated by a client to be executed on a distributed database system;
send a single request to a sequencer server (SEQ-server) to create at least one PiT, wherein the SEQ-server provides a logical timestamp counter (LTC) value as a timestamp of the PiT;
upon creation of the at least one PiT, cause execution of the at least one statement, wherein a PiT provides a state and content of committed data in the distributed database system;
upon receiving a commit statement, perform a commitment process of the transaction, wherein the commitment process is based on a commitment timestamp (CMTS) set by the SEQ-server based on an incremented value of the LTC; and
return an acknowledgment of the transaction commitment to the client.

23. The system of claim 22, wherein the one or more processors are further configured to:
initiate the creation of the at least one PiT further comprises:
receive the single PiT creation request from an SEQ-agent, wherein the PiT creation request is initiated by a transaction manager executing the transaction;
upon receiving of the creation request, increment the LTC value; and
send the incremented LTC value to the SEQ-agent as a PiT timestamp, wherein the PiT timestamp is returned to the transaction manager.

24. The system of claim 22, wherein the one or more processors, when initiating the creation of the at least one PiT, are configured to:
receive a PiT creation request from an SEQ-agent, wherein the PiT creation request is initiated by a transaction manager executing the transaction;
queue the received PiT request in the SEQ-server;
upon satisfying a PiT creation rule, increment the LTC value; and
send the incremented LTC value to the SEQ-agent as a PiT timestamp, wherein the PiT timestamp is returned to the transaction manager.

25. The system of claim 24, wherein the one or more processors are further configured to:
receive a plurality of PiT creation requests from a plurality of SEQ-agents; and
for each queued PiT creation request, send a response with the incremented LTC value to a respective SEQ-agent as the PIT timestamp.

26. The system of claim 25, wherein the PiT creation rule includes any one of:
a predetermined number of PiT creation requests, a predetermined time window, or both.

27. The system of claim 22, wherein the one or more processors, when initiating the creation of the at least one PiT, are configured to:
receive a PiT creation request at an SEQ-agent, wherein the PiT creation request is initiated by a transaction manager executing the transaction;
queue the received PiT request in the SEQ-agent;
upon satisfying a SEQ-agent-side PiT creation rule, send a single unified PiT creation request to the SEQ-server to create a unified PiT for all requests queued in the SEQ-agent; and
receive the incremented LTC value as a unified PiT timestamp, wherein the unified PiT timestamp is returned to the transaction manager.

28. The system of claim 27, wherein the one or more processors are further configured to:
receive a plurality of PiT creation requests from a plurality of transaction managers; and
for each queued PiT creation request, send a response with the unified PiT timestamp to a respective transaction manager.

29. The system of claim 28, wherein the one or more processors are further configured to:
queue the unified PiT creation request in the SEQ-server; and
upon satisfying a SEQ-server-side PiT creation rule, increment the LTC value, thereby creating a unified PiT timestamp, wherein the created unified PiT timestamp serves multiple unified PiT creation requests sent by a plurality of SEQ-agents.

30. The system of claim 29, the SEQ-server-side PiT creation rule includes any one of:
a predetermined number of PiT creation requests, a predetermined time window, or both, wherein the SEQ-server-side PiT creation rule is triggered when a first transaction manager of the plurality of transaction managers calls the SEQ-agent.

31. The system of claim 22, wherein the one or more processors are further configured to:
generate the CMTS based on the incremented value of the LTC.

32. The system of claim 31, wherein the one or more processors are further configured to:
receive a CMTS creation request from an SEQ-agent, wherein the CMTS creation request is initiated by a transaction manager executing the transaction;
upon reception of the creation request, increment the LTC value; and
send the incremented LTC value to the SEQ-agent as the CMTS, wherein the CMTS is returned to the transaction manager.

33. The system of claim 31, wherein the one or more processors are further configured to:
receive a CMTS creation request at an SEQ-agent, wherein the CMTS creation request is initiated by a transaction manager executing the transaction;
queue the received CMTS request in the SEQ-agent;
count the queued CMTS requests;
upon satisfying a CMTS creation rule, send a single CMTS creation request, wherein the single CMTS creation request specifies a number of queued CMTS requests; and
receive a range of LTC values as CMTSs.

34. The system of claim 33, wherein the one or more processors are further configured to:
receive a plurality of CMTS creation requests from a plurality of transaction managers; and
for each queued CMTS creation request, send a response to a respective transaction manager with a CMTS from the received CMTSs, wherein each of the plurality of transaction managers receives a different CMTS.

35. The system of claim 33, wherein the CMTS creation rule includes any one of: a predetermined number of CMTS creation requests, a predetermined time window, or both.

36. The system of claim 22, wherein the one or more processors, when performing the commitment process of the transaction, are configured to:
place a commit pause on each data cell modified by the transaction;
obtain the CMTS;
send a commit completion message to a transaction agent that participated in the execution of the transaction; and
cause the transaction agent to commit row-versions and release any commit pause.

37. The system of claim 22, wherein the one or more processors are configured to execute the at least one statement performing any one of a write operation and a read operation.

38. The system of claim 37, wherein the one or more processors, when performing the read operation, are configured to:
read data from at least the created PiT.

39. The system of claim 37, wherein the one or more processors, when performing the read operation, are configured to:
when data has changed after the creation of the PiT, read data from at least a latest committed row-version.

40. The system of claim 37, wherein the one or more processors, when performing the write operation, are configured to:
write data to at least one data cell in an uncommitted manner.

41. The system of claim 22, wherein the distributed database system comprises: one SEQ-server and a plurality of SEQ-agents executed on a plurality of nodes of the distributed database system, wherein each of the plurality of nodes incudes a storage implementing a persistent data-layout that allows multi-version data-cells.

42. The system of claim 41, wherein the plurality of SEQ-agents are configured at a predefined hierarchy.

43. A distributed database system comprises:
a plurality of nodes, wherein each of the plurality of nodes incudes a storage implementing a persistent data-layout that allows multi-version data-cells and one or more processors;
one sequencer server (SEQ-server); and
a plurality of SEQ-agents executed on a plurality of nodes of the distributed database system;
wherein the one or more processors on each node configured to:
receive at least one statement being part of a transaction, wherein the transaction is initiated by a client to be executed on a distributed database system;
send a single request to the SEQ-server to create at least one PiT, wherein the SEQ-server provides a logical timestamp counter (LTC) value as a timestamp of the PiT;
upon creation of the at least one PiT, cause execution of the at least one statement, wherein a PiT provides a state and content of committed data in the distributed database system;
upon receiving a commit statement, perform a commitment process of the transaction, wherein the commitment process is based on a commitment timestamp (CMTS) set by the SEQ-server based on an incremented value of the LTC; and
return an acknowledgment of the transaction commitment to the client.

44. The system of claim 43, wherein the plurality of SEQ-agents are configured at a predefined hierarchy.

45. A non-transitory computer-readable medium storing a set of instructions for managing execution of database transactions by facilitating point-in-time image (PiT), the set of instructions comprising:
one or more instructions that, when executed by one or more processors of a device, cause the device to:
receive at least one statement being part of a transaction, wherein the transaction is initiated by a client to be executed on a distributed database system;
send a single request to a sequencer server (SEQ-server) to create at least one PiT, wherein the SEQ-server provides a logical timestamp counter (LTC) value as a timestamp of the PIT;
upon creation of the at least one PiT, cause execution of the at least one statement, wherein a PiT provides a state and content of committed data in the distributed database system;
upon receiving a commit statement, perform a commitment process of the transaction, wherein the commitment process is based on a commitment timestamp (CMTS) set by the SEQ-server based on an incremented value of the LTC; and return an acknowledgment of the transaction commitment to the client.

* * * * *